US011408795B2

(12) United States Patent  (10) Patent No.: US 11,408,795 B2
Higuchi et al.  (45) Date of Patent: Aug. 9, 2022

(54) SEALABILITY EVALUATION METHOD AND THE LIKE AND STANDARD ARTIFICIAL LEAK DEVICE

(71) Applicant: FUKUDA CO., LTD., Tokyo (JP)

(72) Inventors: Yasuhiko Higuchi, Tokyo (JP); Masakazu Ito, Tokyo (JP); Yuho Matsui, Tokyo (JP); Mao Hirata, Tokyo (JP)

(73) Assignee: Fukuda Co., Ltd., Tokyo (JP)

( * ) Notice: Subject to any disclaimer, the term of this patent is extended or adjusted under 35 U.S.C. 154(b) by 0 days.

(21) Appl. No.: 17/050,246

(22) PCT Filed: Apr. 25, 2019

(86) PCT No.: PCT/JP2019/017679
§ 371 (c)(1),
(2) Date: Oct. 23, 2020

(87) PCT Pub. No.: WO2019/216243
PCT Pub. Date: Nov. 14, 2019

(65) Prior Publication Data
US 2021/0080341 A1   Mar. 18, 2021

(30) Foreign Application Priority Data

May 10, 2018  (JP) ............................. JP2018-091085

(51) Int. Cl.
*G01M 3/26*  (2006.01)
*G01M 3/28*  (2006.01)
(Continued)

(52) U.S. Cl.
CPC .......... *G01M 3/2853* (2013.01); *G01M 3/007* (2013.01); *G01M 3/3263* (2013.01)

(58) Field of Classification Search
CPC .................................................... G01M 3/007
See application file for complete search history.

(56) References Cited

U.S. PATENT DOCUMENTS 3,028,750 A  *  4/1962  Rondeau ............. G01M 3/3263
                                                73/49.2
T940,004 I4 *  11/1975  Dixon ..................... G01M 3/26
                                                138/40
(Continued)

FOREIGN PATENT DOCUMENTS

CN       204043747 U     12/2014
JP       2017-215310 A   12/2017

OTHER PUBLICATIONS

International Bureau of WIPO, Translation of the International Preliminary Report on Patentability from corresponding International Application No. PCT/JP2019/017679, dated Nov. 19, 2020.
(Continued)

*Primary Examiner* — Alexander A Mercado
(74) *Attorney, Agent, or Firm* — Jodi A. Reynolds, Esq.; Harter Secrest & Emery LLP

(57) ABSTRACT

It is an object of the present invention to enhance reliability of an allowable limit conductance used for setting a threshold value for evaluating sealability of a test object, and further, enhance reliability of the sealability evaluation. By leak testing a test object 9A with a sealing defect 9g, a leakage characteristic that shows a relationship between an internal-external pressure difference and a leak flow rate is obtained. A conductance of a test object with a similar artificial leak 9B having a similar artificial leak device 29 disposed therein, conducting the leak-detected substance is measured. The similar artificial leak device 29 has a leakage characteristic similar to the obtained leakage characteristic. An allowable limit conductance is obtained based on results of the measurement. Sealability of a test object 9 is evaluated based on a threshold value set with a standard artificial leak device 9S having the allowable limit conductance.

6 Claims, 5 Drawing Sheets

(51) Int. Cl.
 *G01M 3/32* (2006.01)
 *G01M 3/00* (2006.01)

(56) References Cited

U.S. PATENT DOCUMENTS

| | | | | |
|---|---|---|---|---|
| 5,850,036 | A | * 12/1998 | Giromini | G01M 3/226 |
| | | | | 73/40 |
| 6,233,908 | B1 | * 5/2001 | Rink | B60R 21/272 |
| | | | | 73/49.3 |
| 2001/0003917 | A1 | * 6/2001 | Sagi | G01M 3/329 |
| | | | | 73/40 |
| 2005/0081597 | A1 | * 4/2005 | Hoffmann | G01M 3/007 |
| | | | | 73/1.02 |
| 2005/0247110 | A1 | * 11/2005 | Sagi | G01M 3/3254 |
| | | | | 73/40 |
| 2011/0226043 | A1 | * 9/2011 | Flrpo | G01M 3/207 |
| | | | | 73/40 |
| 2018/0328812 | A1 | * 11/2018 | Fukushima | G01M 3/329 |
| 2019/0285507 | A1 | 9/2019 | Hirata et al. | |

OTHER PUBLICATIONS

Japan Patent Office, International Search Report for corresponding International Application No. PCT/JP2019/017679, dated Jul. 16, 2019.

\* cited by examiner

SEALABILITY EVALUATION METHOD AND THE LIKE AND STANDARD ARTIFICIAL LEAK DEVICE

FIELD OF THE INVENTION

The present invention relates to a method for evaluating sealability, a method for setting a threshold value for a sealability evaluation, a method for manufacturing a standard artificial leak device for the sealability evaluation and a standard artificial leak device. The present invention particularly relates to a standard artificial leak device having an allowable limit conductance and a method for manufacturing the same and the like.

BACKGROUND OF THE INVENTION

A known method for evaluating sealability of a test object (object of inspection), for example, is a leak testing in which a test pressure is applied to the test object and leakage is measured. For judging acceptance/rejection in such a testing, it is required to set a threshold value as a criterion of judgement beforehand.

Patent Document 1 discloses preparing a chamber-type conductance test apparatus, for example, and dividing an inside of the chamber into an external test space and an internal test space with a dividing wall. The external test space corresponds to an external environment of a test object. The internal test space corresponds to an internal environment of the test object. An artificial leak device is disposed in the dividing wall such that the two test spaces are communicated via a leak hole of the artificial leak device. In this condition, an allowable limit conductance at which a leak flow rate of a leak-detected substance reaches an allowable limit is obtained. A threshold value for a sealability evaluation is set with a standard artificial leak device having the allowable limit conductance. The sealability of the test object is evaluated against the threshold value.

PRIOR ART DOCUMENTS

Patent Documents

Patent Document 1: Japanese Patent Application Publication No. 2017-215310

SUMMARY OF THE INVENTION

Problem to be Solved by the Invention

In the Patent Document 1, a path length of the leak hole of the leak device was determined based on a thickness of a weak seal part in a wall of the test object or in a sealed portion or the like. However, a path length of an actual defect hole is not necessarily equal to the thickness of the wall or the sealed portion. Moreover, a relationship between an internal-external pressure difference and a leak flow rate tends to be different depending on whether the defect hole has an orifice configuration or a capillary configuration, for example.

In view of the above, it is an object of the present invention to enhance reliability of an allowable limit conductance to be used for setting a threshold value for evaluating sealability of a test object, to enhance reliability of a standard artificial leak device having the allowable limit conductance, and further, to enhance reliability of a sealability evaluation.

Means for Solving the Problems

To solve the problems mentioned above, the present invention provides a method for evaluating sealability of a test object against a threshold value set with a standard artificial leak device having an allowable limit conductance at which leakage of a leak-detected substance to an inside or an outside of a test object reaches an allowable limit, a method for setting the threshold value or a method for manufacturing a standard artificial leak device, the method including steps of: obtaining a leakage characteristic showing a relationship between an internal-external pressure difference and a leak flow rate of a test object with a sealing defect by leak-testing the test object with the sealing defect; measuring a conductance with respect to the leak-detected substance in a test object with a similar artificial leak, the test object with the similar artificial leak having a similar artificial leak device disposed therein, the similar artificial leak device having a leakage characteristic similar to the obtained leakage characteristic; and obtaining the allowable limit conductance based on results of the measurement.

The present invention also provides a standard artificial leak device having an allowable limit conductance obtained by the method given above.

Modes of the sealing defect may include a breakage, a crack, a loosening of a lid or a cock, contamination of a sealing surface with a foreign substance and penetration, for example.

Preferably, the sealing defect is a real defect actually formed in the test object. Preferably, the test object with the sealing defect is a test object with a real defect. For example, a product that is judged to be sealing defective in an inspection during manufacturing or before shipping and a product that is returned by an end-user and the like for being defective may be used as the test object with the sealing defect (test object with the real defect). When it is difficult to obtain a defective product, an artificial defect that is approximate to the real defect may be formed in a good product and the product may be used as the test object with the sealing defect. The simulated defect may be made by an artificial leak device. The approximate simulated defect may be formed such that a flow passage cross-sectional area (hole diameter) and a flow passage length thereof are approximate to those of a defect (breakage, for example) having the smallest amount of leakage among the modes of defect including the breakage, the crack, the loosening of the lid or the cock, the contamination of the sealing surface with the foreign substance and the penetration.

Preferably, the sealing defect is a defect equivalent to a typical defect or a defect approximate to the typical defect. The typical defect is a defect typical to the test object, including a representative defect of the test object, a defect of the test object with a relatively high or a highest formation probability, a defect formed in a portion of the test object with a low sealability and a defect that may become particularly problematic in terms of quality, safety, economic efficiency or the like. Preferably, the typical defect is conceived according to a nature, a material, a manufacturing method and modes of transportation, storage and usage and the like. When a leak-detected substance can permeate a wall of a test object without a defect, it may be modeled as a test object with a defect that may cause a leakage corresponding to the permeation formed in an impermeable wall.

Preferably, a fluid pressure of a fluid in a same phase state as the leak-detected substance is applied to the test object with the sealing defect in the step of obtaining a leakage characteristic.

The phase state refers to a state of substance such as gas, liquid and the like. For example, when the leak-detected substance is gas such as water vapor and oxygen, it is preferable that a gas pressure such as air pressure is applied to the test object with the sealing defect as the fluid pressure. When the leak-detected substance is liquid such as chemical solution, it is preferable that a liquid pressure such as water pressure is applied to the test object with the sealing defect as the fluid pressure.

It is not required that the fluid should include the leak-detected substance. For example, when the leak-detected substance is liquid such as chemical solution, water may be used as the fluid.

The fluid pressure may be a positive pressure or a negative pressure. A positive fluid pressure may be applied to an outside of the test object with the sealing defect, and a leakage from the outside to an inside of the test object with the sealing defect may be measured. The test object with the sealing defect may be placed in a vacuum chamber and a pressure inside the vacuum chamber is made negative, and a leakage from an inside of the test object with the sealing defect to an outside may be measured. When the test object is a container containing liquid such as chemical solution, water may be put in the test object with the sealing defect, the test object with the sealing defect may be placed in a vacuum chamber, and leakage of water from an inside of the test object with the sealing defect to an outside may be measured.

Advantageous Effects of the Invention

According to the present invention, reliability of an allowable limit conductance to be used for setting a threshold value for evaluating sealability of a test object and reliability of a standard artificial leak device having the allowable limit conductance can be enhanced, and further, reliability of a sealability evaluation can be enhanced.

BRIEF DESCRIPTION OF THE DRAWINGS

FIG. 3 (b) is an explanatory front view, showing a conductance measurement step in which a similar artificial leak device that is a capillary is used.

FIG. 3 (c) is an explanatory front view, showing a conductance measurement step in which a similar artificial leak device that is a micropipette is used.

FIG. 4 (b) is an enlarged cross-sectional view of the circled portion IVb of FIG. 3(b).

FIG. 4 (c) is an enlarged cross-sectional view of the circled portion IVc of FIG. 3(c).

MODE FOR CARRYING OUT THE INVENTION

One embodiment of the present invention will be described hereinafter with reference to the drawings.

Figure 7:
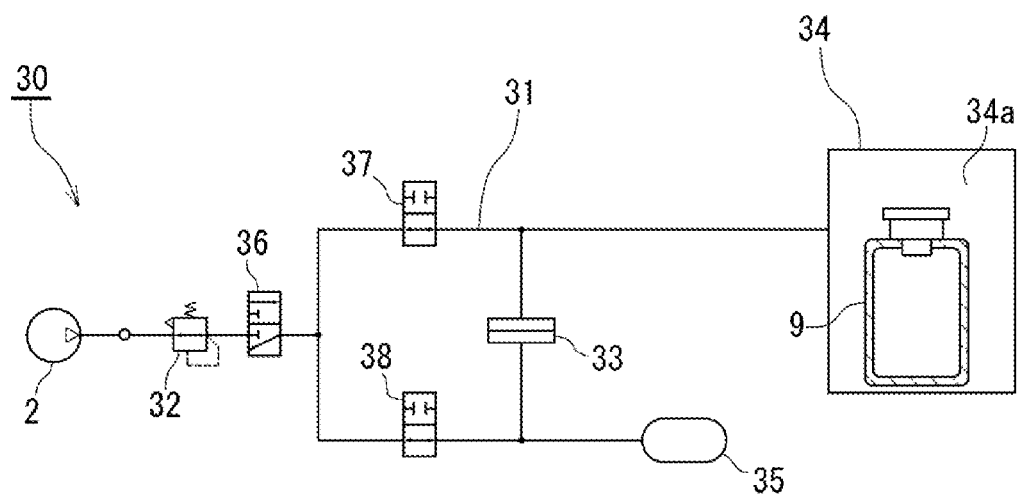
FIG. 7 is a circuit diagram of the leak testing apparatus during execution of a sealability evaluation step conducted on a real test object.

As shown in FIG. 7, a test object 9 in this embodiment is a vial container, for example. Sealability of the test object 9 is evaluated. Specifically, inspection is conducted to determine whether a degree of entrance (leakage) of a leak-detected substance from an external atmosphere to an inside of the test object 9 falls within an acceptable range or not.

The leak-detected substance is a substance that affects quality of contents of the test object 9, which may include oxygen, water vapor and air, for example. The leak-detected substance may be bacteria.

A variety of the leak-detected substance is not limited to one. Multiple components such as oxygen and water vapor may be selected as the leak-detected substance.

The test object as an object of a sealability evaluation is not limited to the vial container, but may be a blister package, an eye lotion container, a gasoline tank, an engine component, an electronic component and any other goods for which sealability is required.

For example, leakage of a specific leak-detected substance from an inside of a test object, which may include leakage of pharmaceutical ingredients from an inside of a vial container and leakage of gasoline from a gasoline tank, to an outside may be evaluated.

To evaluate the sealability mentioned above, a threshold value for the evaluation is set in the following manner:

<Leakage Characteristic Obtaining Step>

Figure 1:
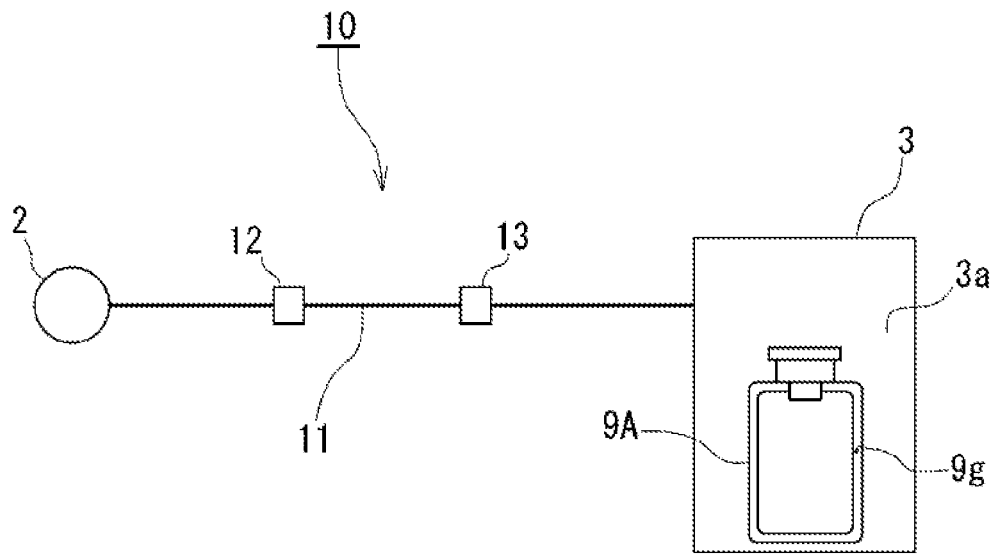
FIG. 1 is an explanatory circuit diagram of a leakage characteristic testing apparatus used in a leakage characteristic obtaining step of a sealability evaluation method according to one embodiment of the present invention.

As shown in FIG. 1, a test object 9 having a sealing defect 9g that is a real defect formed therein is prepared. The test object 9 is referred to as a "test object with a sealing defect 9A" hereinafter. Preferably, the test object with the sealing defect 9A may be a product that is judged to be sealing defective in an inspection during manufacturing or before shipping or a product that is returned by an end-user for being defective. When it is difficult to obtain such a defective product, a simulated defect that is approximate to the real defect may be formed in a non-defective product and the product may be used as the test object with the sealing defect 9A. Preferably, the sealing defect 9g is a defect approximate to a typical defect. The sealing defect 9g in FIG. 1 is a crack in a peripheral wall generated by vibrations during transportation of the test object, for example. However, the defect is not limited to such a crack, but may be a defect by defective sealing of a lid, a defect due to a manufacturing failure or the like.

Further, as shown in FIG. 1, a leakage characteristic testing apparatus 10 is prepared.

The leakage characteristic testing apparatus 10 includes a test path 11, an internal-external pressure difference setter 12 and a leak flow rate measuring instrument 13. A pressure source 2 such as an air compressor is connected to an upstream end of the test path 11. A chamber 3 is disposed at a downstream end of the test path 11.

The internal-external pressure difference setter 12 and the leak flow rate measuring instrument 13 are disposed on the test path 11. The internal-external pressure difference setter 12 is a pressure control valve (regulator), for example. The leak flow rate measuring instrument 13 may be a flow rate sensor or may be a pressure sensor. In a case where the leak flow rate measuring instrument 13 is a pressure sensor, a flow rate is calculated from inner volumes and measured pressures of the test path 11 and the chamber 3. Further, a temperature correction may be performed. The pressure sensor may be a gauge pressure sensor or may be a differential pressure sensor.

For the sake of accuracy and reliability, it is preferable to use a differential pressure type air leak tester (see FIG. 6) as the leakage characteristic testing apparatus 10.

A leakage characteristic is obtained using the test object with the sealing defect 9A and the leakage characteristic testing apparatus 10 in the following manner:

The test object with the sealing defect 9A is placed inside the chamber 3 and the chamber 3 is sealed. An internal pressure of the test object with the sealing defect 9A is an atmospheric pressure, for example.

A secondary pressure of the internal-external pressure difference setter 12 is introduced into the chamber 3 via the test path 11. Thereby, an internal-external pressure difference $\Delta P_{9A}$ is generated between an internal space of the test object 9A and a space-surrounding-test object 3a (space outside of the test object 9A) between an inner wall of the chamber 3 and an outer surface of the test object with the sealing defect 9A. The internal-external pressure difference $\Delta P_{9A}$ can be adjusted by a secondary pressure setting of the internal-external pressure difference setter 12. Due to the internal-external pressure difference, air leakage is generated from the space-surrounding-test object 3a to an inside of the test object 9A via the sealing defect 9g. The leak flow rate $Q_{9A}$ is measured with the leak flow rate measuring instrument 13.

Leakage may be generated from the inside of the test object 9A to the space-surrounding-test object 3a via the sealing defect 9g by making a pressure of the space-surrounding-test object 3a negative by using a vacuum pump as the pressure source 2.

By using a test object 9A similar to the actual test object 9 (FIG. 7), leakage can be generated under similar conditions to those of a sealability evaluation step on the actual test object 9 to be described later and in a state equivalent to the actual test object 9 (FIG. 7) having a sealing defect portion.

The internal-external pressure difference $\Delta P_{9A}$ is changed by the internal-external pressure difference setter 12 and for each internal-external pressure difference, the leak flow rate $Q_{9A}$ is measured with the leak flow rate measuring instrument 13.

Figure 2:
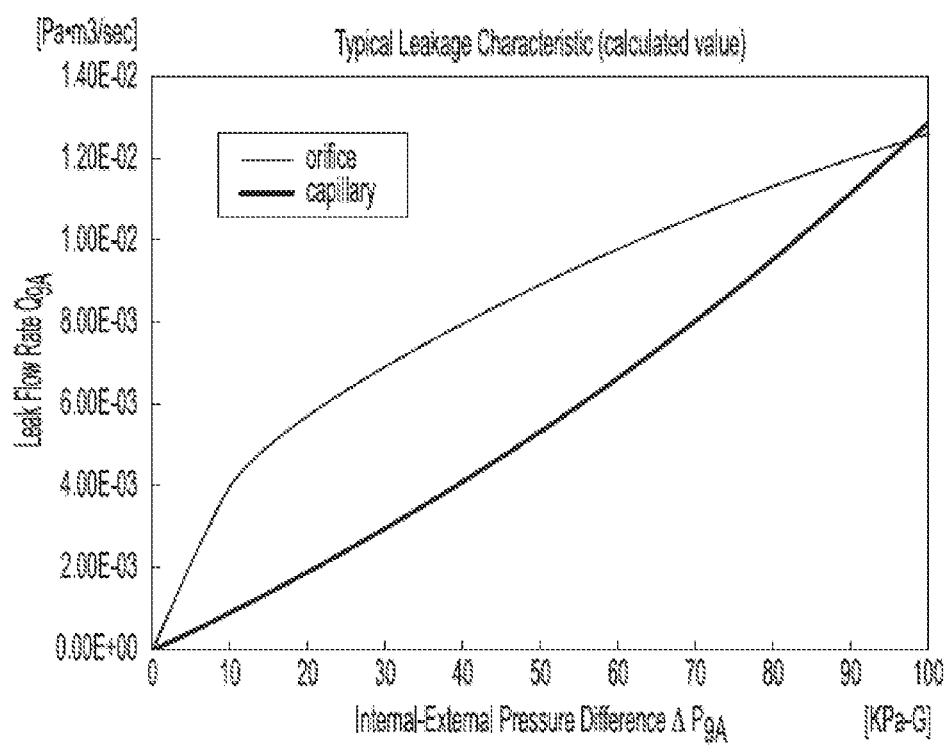
FIG. 2 is a graph of a leakage characteristic calculated under a certain condition.

Thereby, as shown in FIG. 2, a leakage characteristic that shows a relationship between the internal-external pressure difference $\Delta P_{9A}$ and the leak flow rate $Q_{9A}$ of the test object with the sealing defect 9A is obtained.

The leakage characteristic tends to be different according to a configuration of the sealing defect 9g. For example, when the sealing defect 9g has an orifice configuration (pinhole configuration), the leak flow rate $Q_{9A}$ varies linearly or logarithmically with respect to the internal-external pressure difference $\Delta P_9 A$. That is, as the internal-external pressure difference $\Delta P_9 A$ is increased, the leak flow rate $Q_{9A}$ is increased in a proportional manner or as the internal-external pressure difference $\Delta P_{9A}$ is increased, a gradient of increase of the leak flow rate $Q_{9A}$ is gradually decreased (thin line of FIG. 2). This can be understood from a relational expression between a flow rate and a pressure in a turbulent flow (Expressions 1 and 2).

[Expression 1]

$$Q = 600 \cdot C \cdot P_1 \sqrt{\frac{293}{T}} \quad (1)$$

[Expression 2]

$$Q = 600 \cdot C \cdot P_1 \sqrt{1 - \left(\frac{\frac{P_2}{P_1} - b}{1 - b}\right)^2} \times \sqrt{\frac{293}{T}} \quad (2)$$

Expression 1 is applicable to a choked flow and Expression 2 is applicable to a subsonic flow. In Expression 1 and Expression 2, Q denotes a flow rate (L/min), C denotes a sonic conductance (dm³/(s·bar)), $P_1$ denotes an inlet pressure, i.e. a pressure (MPa abs) set by the internal-external pressure difference setter 12, $P_2$ denotes an outlet pressure, i.e. an internal pressure (MPa abs) of the test object with the sealing defect 9A, T denotes an absolute temperature (K) and b denotes a critical pressure rate.

In the sealing defect 9g having an orifice configuration, the flow of the leak is a turbulent flow, showing a leakage characteristic specific to a turbulent flow.

In the sealing defect 9g having a capillary configuration (elongated hole configuration), a leakage characteristic is quadric. That is, as the internal-external pressure difference $\Delta P_{9A}$ is increased, a gradient of increase of the leak flow rate $Q_{9A}$ is gradually increased (thick line of FIG. 2). This can be understood from the Hagen-Poiseuille equation about compressive fluid (Expression 3).

[Expression 3]

$$Q_G = \frac{\pi D^4}{128 \eta_G L} \cdot \frac{P_1 + P_2}{2} (P_1 - P_2) \quad (3)$$

In Expression 3, $Q_G$ denotes a flow rate (Pa·m³/s), D denotes a diameter of pipe, i.e. sealing defect 9g (m), $\eta_G$ denotes viscosity coefficient of gas (Pa·s), L denotes a length of pipe, i.e. sealing defect 9g (m) and $P_1$ and $P_2$ are same as in Expression 1.

In the sealing defect 9g having a capillary configuration, the flow of the leak is a laminar flow, showing a leakage characteristic specific to a laminar flow.

Further, when a hole diameter of the sealing defect 9g is minute, the flow of the leak is a molecular flow, showing a leakage characteristic specific to a molecular flow.

<Similar Artificial Leak Device Selecting Step>

Figure 3A:
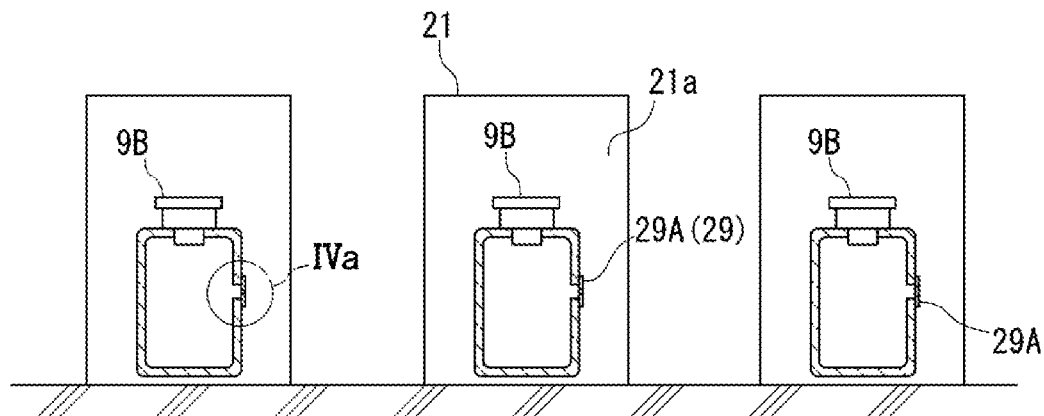
FIG. 3 (a) is an explanatory front view, showing a conductance measurement step in which a similar artificial leak device that is an orifice is used.
Figure 3B:
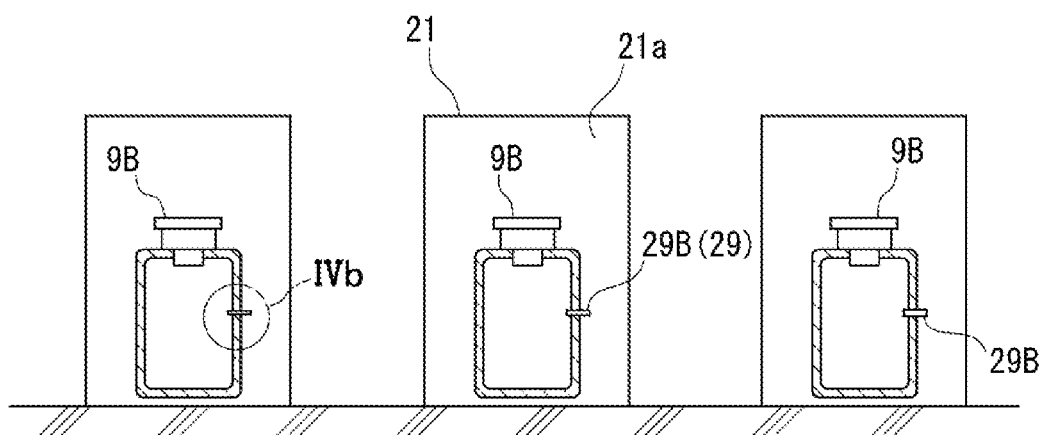
Figure 3C:
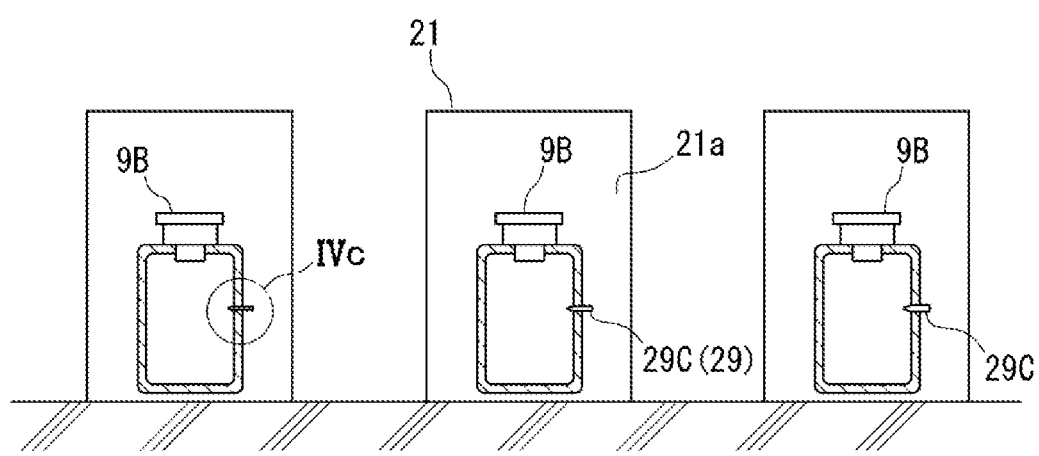
Figure 4A:
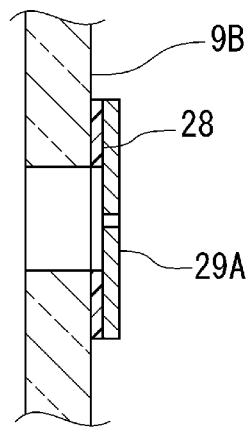
FIG. 4 (a) is an enlarged cross-sectional view of the circled portion IVa of FIG. 3(a).
Figure 4B:
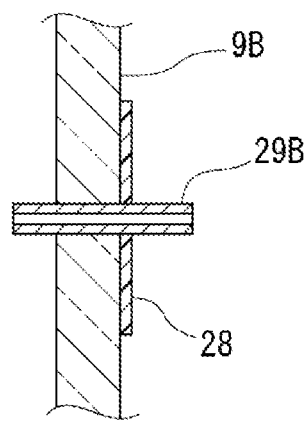
Figure 4C:
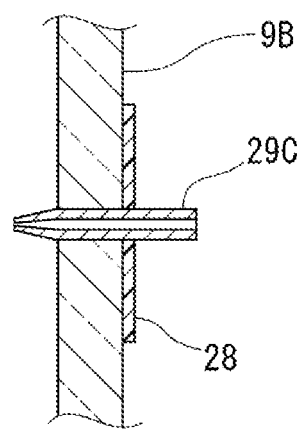

As shown in FIGS. 3 and 4, based on the leakage characteristic obtained in the leakage characteristic obtaining step, a similar artificial leak device 29 having a leakage characteristic similar to the obtained leakage characteristic is selected.

For example, when the leakage characteristic is that of a turbulent flow, an artificial leak device 29A that is an orifice is selected (FIG. 3 (a) and FIG. 4 (a)).

When the leakage characteristic is that of a laminar flow, an artificial leak device 29B that is a capillary is selected (FIG. 3 (b) and FIG. 4 (b)).

When the leakage characteristic is that of a molecular flow, an artificial leak device 29C that is a micropipette is selected (FIG. 3 (c) and FIG. 4 (c)).

Further, a plurality of the selected kind of similar artificial leak devices 29 having different hole dimensions, and further different conductance, are prepared.

In a case where the artificial leak device 29A is an orifice, a plurality of the artificial leak devices 29A that are different only in hole diameter (flow passage cross-sectional area) may be prepared.

In a case where the artificial leak device 29B is a capillary or where the artificial leak device 29C is a micropipette, a plurality of the artificial leak devices that have a same hole diameter (flow passage cross-sectional area) and different hole lengths (flow passage lengths) may be prepared, a plurality of the artificial leak devices that have a same hole length (flow passage length) and different hole diameters (flow passage cross-sectional areas) may be prepared, or a plurality of the artificial leak devices that have different hole diameters (flow passage cross-sectional areas) and different hole lengths (flow passage lengths) may be prepared.

<Test Object with Similar Artificial Leak Preparing Step>

As shown in FIGS. 4 (*a*) to 4 (*c*), the selected similar artificial leak device 29 is disposed in the test object 9. For example, an opening is formed in the test object 9 and the similar artificial leak device 29 is mounted in the opening. The similar artificial leak device 29 may be fixed to the test object 9 with a fixing agent 28 such as epoxy resin.

The test object 9 having the similar artificial leak device 29 disposed therein is referred to as a "test object with a similar artificial leak 9B" hereinafter.

Further, a plurality of test objects with the similar artificial leak 9B are made by preparing a plurality of test objects 9 and respectively disposing a plurality of similar artificial leak devices 29 that are different in the conductance in the test objects 9.

<Conductance Measurement Step>

As shown in FIGS. 3 (*a*) to 3(*c*), a test chamber 21 for measuring the similar artificial leak is prepared. The test object with the similar artificial leak 9B is placed in the test chamber 21 and the test chamber 21 is sealed.

Further, a plurality of test chambers 21 are prepared and a plurality of test objects with the similar artificial leak 9B that are different in the conductance are respectively placed in the test chambers 21.

An atmosphere gas in an inner space of the test chamber 21, i.e. in a space-surrounding-test object 21*a* between an inner wall of the test chamber 21 and an outer surface of the test object with the similar artificial leak 9B is replaced with a gas containing the leak-detected substance. An inside of the test object with the similar artificial leak 9B and the space-surrounding-test object 21*a* are communicated via the hole of the similar artificial leak device 29.

By using the test object with the similar artificial leak 9B having the similar artificial leak device 29 disposed therein, artificial leakage can be generated in equivalent conditions to those of the actual test object 9 (FIG. 7) with the sealing defect portion.

Figure 5:
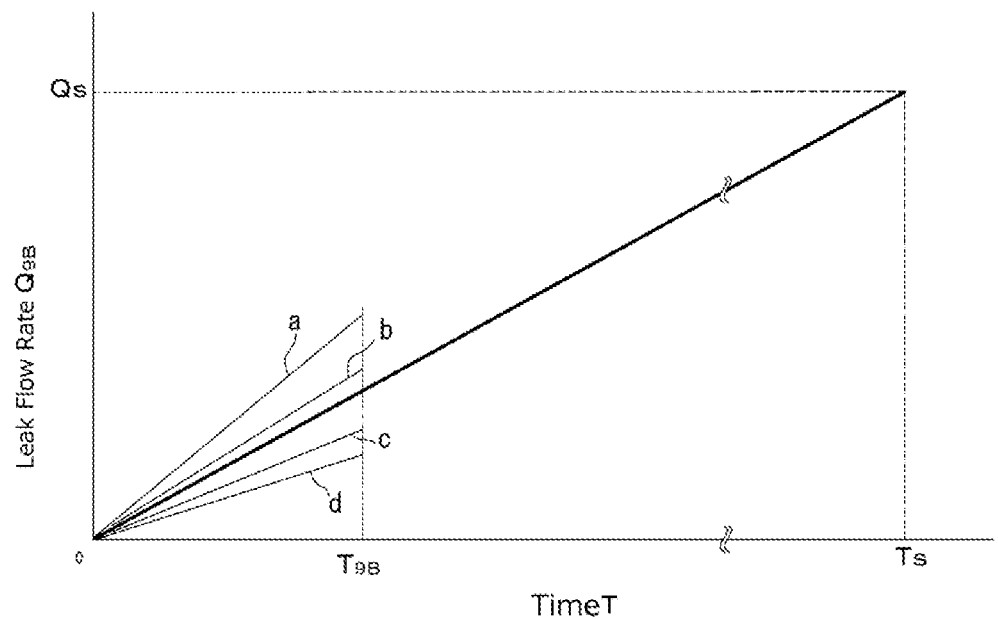
FIG. 5 is a graph for explaining a step of obtaining an allowable limit conductance based on results of measurements in the conductance measurement step.

As shown in FIG. 5, a leak flow rate $Q_{9B}$ of the leak-detected substance from the space-surrounding-test object 21*a* to the inside of the test object with the similar artificial leak 9B is measured. In other words, a conductance of the similar artificial leak device 29, further of the test object with the similar artificial leak 9B, conducting the leak-detected substance is measured.

A measuring time $T_{9B}$ is from a few days to several months, for example.

The leak flow rate can be calculated from an initial concentration (0%) of the leak-detected substance inside the test object with the similar artificial leak 9B and a concentration thereof after the passage of the measuring time.

A plurality of thin lines a, b, c, d in the graph of FIG. 5 depict the leak flow rates $Q_{9B}$ of the plurality of the test objects with the similar artificial leak 9B. Gradients of the thin lines a, b, c, d respectively correspond to conductance of the corresponding similar artificial leak devices 29.

<Allowable Limit Conductance Obtaining Step>

An allowable limit conductance at which leakage of the leak-detected substance reaches an allowable limit is obtained from the results of the measurements of the conductance. An allowable limit of a leak flow rate is a maximum leak flow rate at which quality of contents such as pharmaceuticals to be contained in the test object 9 can be maintained until an end of a quality assurance period, for example. The quality assurance period is an effective period in which quality and efficacy of the contents such as pharmaceuticals can be maintained, for example.

For example, in the graph of FIG. 5, a gradient of a thick line connecting an origin and an intersection of an allowable limit leak flow rate Qs and a quality assurance period $T_S$ may be regarded as the allowable limit conductance.

When there are a plurality of leak-detected substances such as oxygen and water vapor, the test chamber 21 is prepared for each kind of the leak-detected substances, and the allowable limit conductance is obtained for each leak-detected substance. Preferably, among the obtained allowable limit conductance, the most restrictive one is selected as the allowable limit conductance to be used in steps given below.

<Standard Artificial Leak Device Manufacturing Step>

Figure 6:
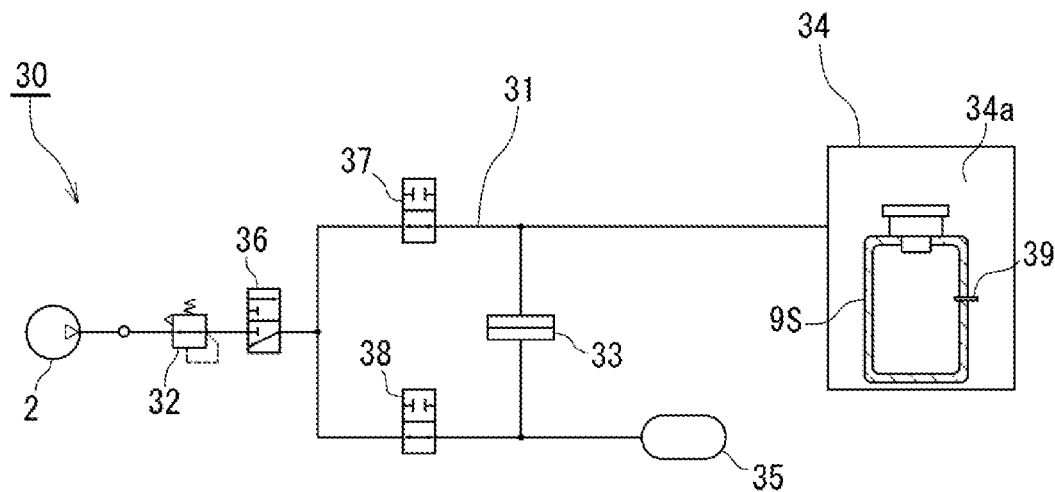
FIG. 6 is a circuit diagram of a leak testing apparatus during execution of a threshold value setting step.

Subsequently, a standard artificial leak device 39 having the allowable limit conductance is prepared as shown in FIG. 6. The standard artificial leak device 39 is an artificial leak device of the same kind as the similar artificial leak device 29. For example, when the similar artificial leak device 29 is an orifice 29A, the standard artificial leak device 39 also is an orifice. When the similar artificial leak device 29 is a capillary 29B, the standard artificial leak device 39 also is a capillary. When the similar artificial leak device 29 is a micropipette 29C, the standard artificial leak device 39 also is a micropipette. Accordingly, the standard artificial leak device 39 has a leakage characteristic similar to that of the test object with the sealing defect 9A.

The standard artificial leak device 39 in FIG. 6 has a capillary configuration.

A flow passage cross-sectional area (hole diameter) and a flow passage length of the standard artificial leak device 39 are determined such that a conductance of the standard artificial leak device 39 is the allowable limit conductance while referring to the flow passage cross-sectional area (hole diameter) and the flow passage length of the similar artificial leak device 29 and the measured conductance mentioned above (FIG. 5).

<Threshold Value Setting Step>

As shown in FIG. 6, the prepared standard artificial leak device 39 is disposed in the test object 9. A location and a method of mounting are similar to those of the similar artificial leak device 29. However, the location and the like of mounting may be different from those of the similar artificial leak device 29.

The test object 9 with the standard artificial leak device 39 disposed therein is referred to as a "test object with the standard artificial leak 9S" hereinafter.

Further, a leak testing apparatus 30 is prepared. A differential pressure type air leak tester may be used as the leak testing apparatus 30, for example. The leak testing apparatus 30 includes a test pressure setter 32 that is a pressure control valve (regulator), a leakage measuring instrument 33 that is a differential pressure sensor, a work capsule 34, a master tank 35, valves 36, 37, 38 and a test path 31 connecting them. The pressure source 2 is connected to an upstream end of the test path 31.

The test object with the standard artificial leak 9S is placed in the work capsule 34 and the work capsule 34 is sealed. An inner space of the work capsule 34, that is a space-surrounding-test object 34a between an inner wall of the work capsule 34 and an outer surface of the test object with the standard artificial leak 9S, and an inside of the test object with the standard artificial leak 9S are communicated via the hole of the standard artificial leak device 39.

A test pressure is set by the test pressure setter 32. The valves 36, 37, 38 are opened to introduce the test pressure to the work capsule 34 and the master tank 35. Subsequently, the valves 37, 38 are closed to make the work capsule 34 and the master tank 35 closed systems independent from each other. In the work capsule 34, gas enters the test object with the standard artificial leak 9S via the hole of the standard artificial leak device 39. Thereby, a pressure difference is generated between the work capsule 34 and the master tank 35. A time variation of the pressure difference is measured by the leakage measuring instrument 33. Based on the measured value, an entrance flow rate into the test object with the standard artificial leak 9S, i.e. a leak flow rate $Q_{9S}$ of the test object with the standard artificial leak 9S, can be calculated. A threshold value S is set based on the leak flow rate $Q_{9S}$. The leak flow rate $Q_{9S}$ as it is may be used as the threshold value S. A value may be obtained by arithmetic processing such as multiplying the leak flow rate $Q_{9S}$ by a predetermined coefficient, and the value may be used as the threshold value S.

<Sealability Evaluation Step>

Sealability of the actual test object 9 is evaluated against the set threshold value S.

As shown in FIG. 7, a sealability evaluation step can be performed using the same leak testing apparatus 30 as in the threshold value setting step. The actual test object 9 is placed in the work capsule 34. Then, a leak flow rate $A_9$ is obtained in the same manner as in the threshold value setting step. Preferably, a test pressure set by the test pressure setter 32 is equal to the test pressure in the threshold value setting step. After introducing the test pressure to the work capsule 34 and the master tank 35, the valves 37, 38 are closed to make the work capsule 34 and the master tank 35 closed systems independent from each other. When there is a sealing defect portion in the test object 9 in the work capsule 34, gas in the space-surrounding-test object 34a enters the test object 9 via the sealing defect portion. Thereby, a pressure difference is generated between the work capsule 34 and the master tank 35. A time variation ΔP of the pressure difference is measured by the leakage measuring instrument 33. The leak flow rate $Q_9$ can be calculated based on the measured value ΔP.

When the leak flow rate $Q_9$ is not greater than the threshold value S, the sealability of the test object 9 is judged to be acceptable. When the leak flow rate $Q_9$ is greater than the threshold value S, the test object 9 is judged to be not-acceptable.

As described above, in the sealability evaluation method according to the present invention, the allowable limit conductance of the standard artificial leak device 39 is derived from the measured conductance of the test object with the similar artificial leak 9B having a leakage characteristic similar to that of the test object with the sealing defect 9A. Therefore, reliability of the allowable limit conductance can be enhanced and further, reliability of the standard artificial leak device 39 can be enhanced. Furthermore, reliability of the sealability evaluation can be enhanced.

The present invention is not limited to the embodiments described above. Various modifications can be made without departing from the scope and spirit of the invention.

For example, when the leak-detected substance is liquid such as chemical solution contained in the test object 9, leakage of water from the inside of the test object 9A to the space-surrounding-test object 3a via the sealing defect 9g may be generated in the leakage characteristic obtaining step by filling the inside of the test object 9A with water and making the pressure of the space-surrounding-test object 3a negative, and thereby making a water pressure of the inside of the test object 9A (fluid pressure by a fluid in a same phase state as the leak-detected substance) relatively high. The fluid pressure may be applied by liquid such as chemical solution contained in the test object 9.

The threshold value S may be obtained by disposing an artificial leak path in the test path 31 of the leak testing apparatus 30 and connecting the standard artificial leak device 39 to the artificial leak path. In this case, preparation of the test object with the standard artificial leak 9S is not required.

INDUSTRIAL APPLICABILITY

The present invention may be applied to a sealability evaluation of a vial container containing pharmaceutical agents and a PTP package, for example.

EXPLANATION OF REFERENCE NUMERALS 3a space-surrounding-test object (space outside of the test object)
9 test object
9A test object with a sealing defect
9B test object with a similar artificial leak
9S test object with a standard artificial leak
9g sealing defect
10 leakage characteristic testing apparatus
12 internal-external pressure difference setter
13 leak flow rate measuring instrument
21 test chamber
21a space-surrounding-test object (space outside of the test object)
29 similar artificial leak device
29A orifice (similar artificial leak device)
29B capillary (similar artificial leak device)
29C micropipette (similar artificial leak device)
30 leak testing apparatus
31 test path
32 test pressure setter
33 leakage measuring instrument
34a space-surrounding-test object (space outside of the test object)
39 standard artificial leak device

The invention claimed is:
1. A method for evaluating sealability of a test object as an object of evaluation, the method comprising steps of:
obtaining a leakage characteristic showing a relationship between an internal-external pressure difference and a leak flow rate of a test object with a sealing defect by leak-testing the test object with the sealing defect;

determining which among a turbulent flow characteristic, a laminar flow characteristic and a molecular flow characteristic the leakage characteristic has;

measuring a conductance with respect to the leak-detected substance in a test object with a similar artificial leak, the test object with the similar artificial leak having a similar artificial leak device disposed therein, the similar artificial leak device having a leakage characteristic similar to the obtained leakage characteristic;

selecting an orifice as the test object with the similar artificial leak when the leakage characteristic has the turbulent flow characteristic; selecting a capillary as the test object with the similar artificial leak when the leakage characteristic has the laminar flow characteristic; selecting a micropipette as the test object with the similar artificial leak when the leakage characteristic has the molecular flow characteristic;

obtaining an allowable limit conductance at which leakage of a leak-detected substance to an inside or an outside of the test object as the object of evaluation reaches an allowable limit based on results of the measurement; and evaluating the sealability of the test object against a threshold value set with a standard artificial leak device having the allowable limit conductance.

2. The method according to claim 1, wherein a fluid pressure of a fluid in a same phase state as the leak-detected substance is applied to the test object with the sealing defect in the step of obtaining a leakage characteristic.

3. A method for setting a threshold value for a sealability evaluation of a test object as an object of evaluation, the method comprising steps of:

obtaining a leakage characteristic showing a relationship between an internal-external pressure difference and a leak flow rate of a test object with a sealing defect by leak-testing the test object with the sealing defect;

determining which among a turbulent flow characteristic, a laminar flow characteristic and a molecular flow characteristic the leakage characteristic has;

measuring a conductance with respect to the leak-detected substance in a test object with a similar artificial leak, the test object with the similar artificial leak having a similar artificial leak device disposed therein, the similar artificial leak device having a leakage characteristic similar to the obtained leakage characteristic;

selecting an orifice as the test object with the similar artificial leak when the leakage characteristic has the turbulent flow characteristic; selecting a capillary as the test object with the similar artificial leak when the leakage characteristic has the laminar flow characteristic; selecting a micropipette as the test object with the similar artificial leak when the leakage characteristic has the molecular flow characteristic;

obtaining an allowable limit conductance at which leakage of a leak-detected substance to an inside or an outside of the test object as the object of evaluation reaches an allowable limit based on results of the measurement; and setting the threshold value with a standard artificial leak device having the allowable limit conductance.

4. The method according to claim 3, wherein a fluid pressure of a fluid in a same phase state as the leak-detected substance is applied to the test object with the sealing defect in the step of obtaining a leakage characteristic.

5. A method for manufacturing a standard artificial leak device for a sealability evaluation, the method comprising steps of:

obtaining a leakage characteristic showing a relationship between an internal-external pressure difference and a leak flow rate of a test object with a sealing defect by leak-testing the test object with the sealing defect;

determining which among a turbulent flow characteristic, a laminar flow characteristic and a molecular flow characteristic the leakage characteristic has;

measuring a conductance of a test object with a similar artificial leak conducting the leak- detected substance, the test object with the similar artificial leak having a similar artificial leak device disposed therein, the similar artificial leak device having a leakage characteristic similar to the obtained leakage characteristic;

selecting an orifice as the test object with the similar artificial leak when the leakage characteristic has the turbulent flow characteristic; selecting a capillary as the test object with the similar artificial leak when the leakage characteristic has the laminar flow characteristic;

selecting a micropipette as the test object with the similar artificial leak when the leakage characteristic has the molecular flow characteristic;

obtaining an allowable limit conductance at which leakage of a leak-detected substance to an inside or an outside of the test object reaches an allowable limit based on results of the measurement;

manufacturing a standard artificial leak device comprising an orifice when the test object with the similar artificial leak is an orifice, manufacturing a standard artificial leak device comprising a capillary when the test object with the similar artificial leak is a capillary, and manufacturing a standard artificial leak device comprising a micropipette when the test object with the similar artificial leak is a micropipette; and setting a flow passage cross-sectional area and a flow passage length of the standard artificial leak device such that a conductance of the standard artificial leak device is the allowable limit conductance.

6. The method according to claim 5, wherein a fluid pressure of a fluid in a same phase state as the leak-detected substance is applied to the test object with the sealing defect in the step of obtaining a leakage characteristic.

* * * * *